(No Model.)
H. C. KÜRTEN.
APPARATUS FOR DISINFECTING, &c.
No. 565,758. Patented Aug. 11, 1896.
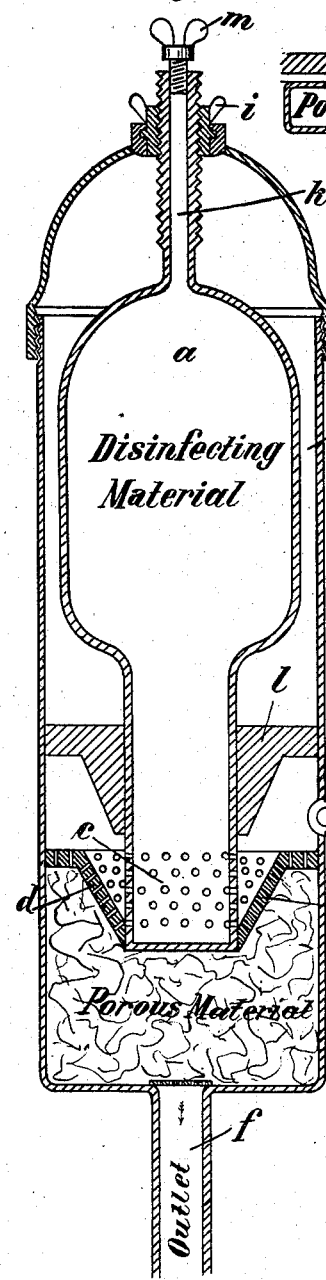
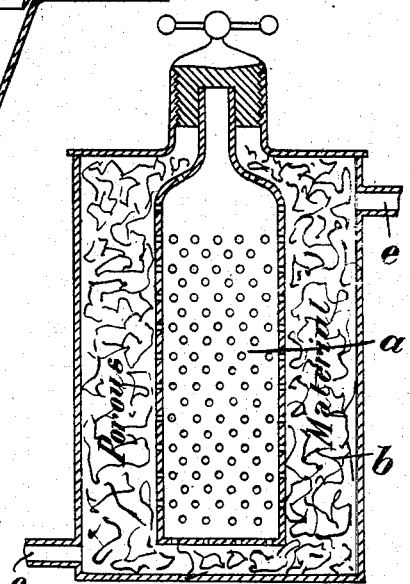
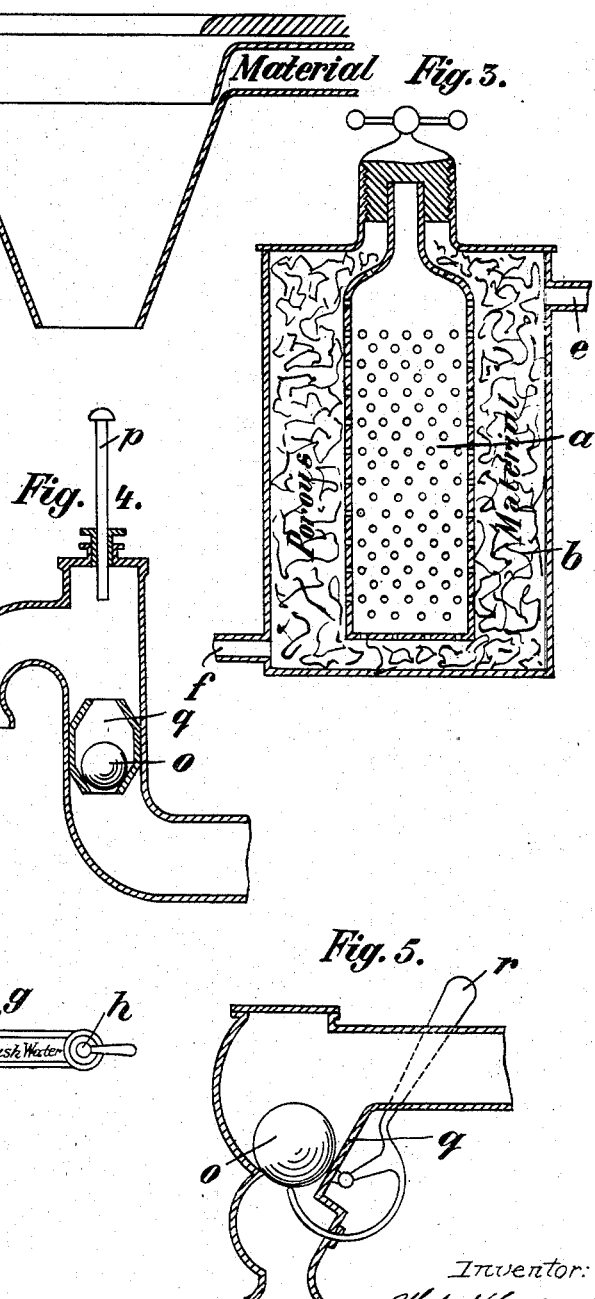
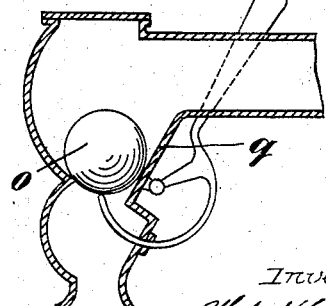
Witnesses:
Inventor:
Hubert Caspar Kürten
by his attorney

UNITED STATES PATENT OFFICE.

HUBERT CASPAR KÜRTEN, OF AIX-LA-CHAPELLE, GERMANY.

APPARATUS FOR DISINFECTING, &c.

SPECIFICATION forming part of Letters Patent No. 565,758, dated August 11, 1896.

Application filed March 18, 1895. Serial No. 542,240. (No model.)

*To all whom it may concern:*

Be it known that I, HUBERT CASPAR KÜRTEN, engineer, of Aix-la-Chapelle, Prussia, German Empire, have invented new and useful Improvements in Apparatus for Disinfecting, Rinsing, and Continuous Watering of Places to be Cleaned, of which the following is a specification.

The object of this invention is an apparatus to be inserted into the rinsing-water conductor of closets, pissoirs, and the like, for the purpose of effecting, without special valves, a continual disinfection, rinsing, and watering of the reservoir to be cleaned after the ordinary rinsing has ceased. This after-rinsing, &c., may in all cases be regulated quickly and exactly, and the arrangement of the apparatus renders it possible to apply as well solid as liquid disinfectants. This aim is reached by the application of a water-absorbing porous material saturated with water during the first rinsing. The material allows the water to flow off again slowly after disinfecting substances have eventually been added.

The accompanying drawings illustrate the object of the invention, as follows:

Figure 1 is the ordinary form of the apparatus in a longitudinal section; Fig. 2, a modification of the invention for smaller proportions, the porous material being directly applied in the upper pad of the closet-funnel. Fig. 3 represents a second modification to be regulated also without cocks or valves, but exclusively with the help of the porous material. Fig. 4 represents a safety-valve construction to be applied with great advantage in connection with apparatuses of this kind in order to prevent, when the chief cock of the water-conductor is turned off, the penetration of bad odors and disinfecting-gases into the chief conductor; and Fig. 5, a modification of this safety-valve.

The ordinary and most suitable form of this apparatus consists of two cylindrical vessels $a$ and $b$, one placed into the other. The interior vessel $a$ is filled with liquid or soluble disinfecting material. A pretty long perforated neck is to be found below, passing through a partition-wall $l$, which divides the exterior vessel $b$ in two parts and is provided with a sort of a knob below, joining the vessel $b$ closely. This knob $d$ is also provided with perforations. The porous material is to be found below. The water-inlet $e$ ends below the partition-wall $l$ and forms a branch of the rinsing-water conductor. At the bottom the outlet $f$, leading to the closet, is to be found. The rinsing-water flows directly to the closet through the pipe $g$ as soon as the rinsing-cock $h$ is opened.

In applying the apparatus in the usual manner the cock $h$ is opened, in order to flush the closet. The greater part of the rinsing-water flows directly through $g$ to the place to be flushed, while the rest rises in the pipe $s$, in consequence of the hydraulic pressure, and flows off into the vessel $b$. Here the rinsing-water saturates the porous material, entering partly the vessel $a$, where a part of the disinfectants is solved. This solution runs through the perforations of the knob, mixed with the remaining water, and flows gradually off through $f$ even after the rinsing through $g$ has already ceased.

In order to be able to regulate the quantity of disinfectant flowing in, the vessel $a$ may be raised and lowered by means of a screw $i$. The lower it is placed the more water is able to penetrate through the perforations of the neck $c$ into the vessel $a$ and the more disinfecting material is solved. If the knob is placed just in front of the mouth of the water-conducting pipe $e$, the water-supply ceases and the apparatus is not working. If the knob is drawn upward so far that it touches the partition-wall $l$, no disinfection at all is taking place, but an after-rinsing with pure water. The respective position may be known from outside by the words "Not," "Weak," "Strong," on the flattened part of the adjusting-screw $i$.

The adjusting-screw is provided with a boring $k$ for the purpose of pouring in the disinfectants, and is closed with a small screw $m$.

When the proportions are only small, one may dispense with the apparatus represented in Fig. 1. The upper part of the funnel is then shaped like a ring-formed vessel, in which the porous material is to be found. Disinfecting liquid may be added from time to time by a similar apparatus, as shown in Fig. 1.

In case the regulation without valves or cocks is dispensed with, the form in Fig. 3 may be given to the apparatus. There the inner vessel $a$ is fixed tightly in the exterior vessel $b$, the outlet $f$ and the inner pipe $e$, branched off from the rinsing-water conductor, remaining unchanged. One may also arrange the apparatus Fig. 1 with a slight alteration, so that in opening and closing the door of the closet the water is allowed to enter the reservoir $b$. The rinsing in this case takes place in the usual manner, while the disinfection begins as soon as one leaves the closet and continues for some time. By connecting the apparatus in Fig. 1 with the funnel in Fig. 2 a greater effect may still be produced, also a longer after-rinsing, as a greater quantity of water remains in the porous material.

Figs. 4 and 5 show a safety-valve construction which may be applied in connection with one of the disinfecting apparatuses. A hollow india-rubber ball $o$ represents the valve-body resting in a conical seat $q$. The water-pressure keeps the valves closed till they are opened by the rod $p$, Fig. 4, or the circular moving rod $r$ in Fig. 5. When the pressure in the conductor ceases, the balls fall down, so that the penetration of bad gases into the conductor is prevented. The apparatus may with slight alterations also be used as a filtering, disinfecting, and purifying oiling apparatus, applying either the exterior or the interior cylinder for the placing of the oil-purifying or disinfecting material.

Having now described my invention, what I claim, and desire to secure by Letters Patent, is—

In an apparatus for disinfecting and rinsing closets, pissoirs and the like, provided with an outlet for water charged with excrements the combination of a vessel $b$ having a partition-wall $l$ with a water-supply pipe $e\ g$ with cock $h$ and an outlet-pipe $f$, a movable receptacle $a$, holding the disinfectant and placed within said vessel $b$ and a funnel and sieve-shaped bottom $d$, joining closely below, as specified.

In witness whereof I have hereunto signed my name in the presence of two subscribing witnesses.

H. C. KÜRTEN.

Witnesses:
T. F. CHRISBERGER,
HANS ACCOLA.